Patented Jan. 10, 1928.

1,655,942

UNITED STATES PATENT OFFICE.

MYRON E. DELANEY, OF NEW YORK, N. Y., AND LINWOOD T. RICHARDSON, OF NEW BRUNSWICK, NEW JERSEY, ASSIGNORS TO THE CUTLER-HAMMER MFG. CO., OF MILWAUKEE, WISCONSIN, A CORPORATION OF WISCONSIN.

NOVEL COMPOSITION OF MATTER.

No Drawing. Application filed July 25, 1921. Serial No. 487,400.

This invention relates to novel compositions of matter.

More particularly the invention relates to a novel gum or resin and to a method of production thereof.

The present invention has among its objects that of providing a novel synthetic composition adapted to the plastic art and capable of production at a very materially reduced expense as compared with that involved in the production of known plastic materials which the instant composition is adapted to replace.

Another and more specific object is that of providing a novel gum or resin which is capable of ready production from ingredients which are exceedingly cheap and plentiful commercially and the compounding of which product involves a minimum of time, labor and technical skill or experience.

Another object is that of providing a method whereby such product may be produced with great facility, certainty and dispatch.

Other objects and advantages will hereinafter appear.

Among the aforenoted relatively cheap and plentiful substances obtainable commercially may be mentioned naphthalene, which also possesses properties apparently adapting the same to use as a constituent of an industrially useful resin or gum.

Moreover, numerous attempts have heretofore been made to so utilize this substance among others, but so far as applicants are aware no product capable of uses comparable or analogous to those herein contemplated has heretofore been produced from this substance, from homologues of benzol or other aromatic hydrocarbon bodies since these substances are not found to react with ordinary agents under usual conditions for formation of such products.

Our experiments have shown that the reaction between a chloride of sulphur and naphthalene or homologues of benzol proceeds very slowly, if at all, even when such substances are boiled together for considerable periods.

We have, however, discovered that when agents such as those aforementioned are brought together in the presence of a suitable activating substance, and under proper temperature conditions, a fundamentally different reaction occurs resulting in a gummy or resinous substance which is plastic and of a consistency which may vary from that of a thin liquid to that of a hard resin, depending on the proportioning of the various agents, the temperature maintained, the length of time during which the reaction is caused or permitted to continue, and upon other factors.

Also such reaction product, irrespective of its consistency as formed, is convertible under suitable heat treatment through practically any desired number of intermediate stages into a state of substantial infusibility, insolubility and inertness toward chemical agents.

Thus this material when plastic may be cast into various shapes and thereafter cut, machined, polished or otherwise treated practically as desired, or the product may be produced or rendered of suitable consistency either with or without the use of a solvent for service as a coating or the like.

Also it is apparently possible to employ this material with great advantage when incorporated with a suitable filler in the production of a molding compound.

In the production of this product, suitable proportions of the constituent agents are brought together in the presence of an activating agent, the temperature being raised somewhat, whereupon reaction tends to proceed with considerable rapidity, such in fact as to render it advisable if not strictly necessary to take certain steps for control thereof.

Such control may be effected in various ways as by addition of reduced portions of one reactive agent to all or less than the total body of the other agent, or optionally the container for the agents undergoing reaction may be jacketed and subjected to cooling action. Such temperature control does not appear to be strictly necessary in the sense that the reaction if uncontrolled tends to progress too far, the control on the other hand being necessary or desirable chiefly to prevent excessive boiling or agitation of the mass, resulting in loss of material and contamination of the surroundings.

During such reaction some hydrochloric acid is evolved, the non-volatile reaction product being of a consistency dependent upon the aforementioned factors.

Upon subsequent heating of this product vaporization takes place, various volatile substances being driven off during the earlier stages of such action, the character of such substances being largely determined by the length of time during which the action is caused to continue, by the temperature maintained and by other factors. Following a given degree of progress of such vaporization action during which the temperature employed is preferably maintained or gradually increased, a chemical reaction occurs. During such later action hydrogen sulphide is liberated and the melting point of the remaining resin gradually increases to a value of 400 to 450 degrees F., and is transformed into the substantially infusible body if held for a sufficiently long period at this temperature.

The substance last mentioned may be regarded as the final product and such product displays in addition to the high melting point aforementioned the further characteristics of inactivity toward ordinary chemical agents and solvents such characteristics tending to adapt the same to the uses to which the ordinary synthetic and natural resins are suited.

As a typical method applicable to production of the aforedescribed resin, substantially equal parts of naphthalene and sulphur monochloride are brought together in the presence of a relatively reduced quantity of a suitable activating agent such, for example, as metallic tin or aluminum or a metallic compound of sulphur such as ferrous sulphide, zinc sulphide and the like. The temperature of the ensemble is raised preferably to about 200° F. at which temperature reaction takes place rather rapidly, hence rendering desirable the application of certain of the aforedescribed expedients for temperature control.

During such reaction hydrochloric acid is evolved somewhat profusely and a relatively non-volatile product is formed, the consistency thereof being variable in accordance with the factors aforementioned. By varying all or certain of such factors the consistency of this gum or resin may be suited to the particular subsequent use contemplated.

When the subsequent use or treatment contemplated does not involve conversion of the aforedescribed reaction product into its final state of infusibility and insolubility, it is desirable and in many cases necessary, following the aforedescribed action, to subject the product to a treatment for elimination or fixation of certain volatile substances such as hydrochloric acid which may be formed but not completely expelled as a result of the main reaction and which, if permitted to remain in situ, might tend to impair the product, Such treatment of the product may involve subjection thereof to heat treatment at a temperature somewhat higher than that at which the main reaction was effected, thus eliminating the aforementioned volatile or potentially volatile substances, the temperature being suitably controlled to prevent transformation of the product into its infusible state. Optionally a relatively small quantity of a substance, such for example, as pyridine, may be mixed with the warmed and melted reaction product for combination with and fixation of such volatile substances.

Also upon subjecting the compound for several hours to a gradually increasing temperature above 200° F., the same is transformed into the final state wherein the same is substantially chemically inert, insoluble and infusible.

The exceedingly low cost of the constituent agents of the instant product, particularly naphthalene, renders the same available for many uses from which most of the ordinary synthetic and natural resins are excluded by reason of excessive cost, whereas, the great facility and certainty of the production reaction and the readily effected conversion of the product into practically any desired state or consistency also constitute exceedingly useful and valuable improvements over known substances.

Throughout the instant description and also in the appended claims the terms "naphthalene", "benzol", "chloride of sulphur", "sulphur monochloride" and the like are to be understood as including the substances which are obtainable commercially.

It will be understood that the quantity of agent necessary to activate the aforedescribed reaction is under certain conditions extremely small and is dependent to some extent at least upon the degree or state of dispersion of the activating substance; and in practice the quantity of such substance employed may frequently be greatly reduced without lessening its effectiveness.

It is therefore to be understood throughout the instant description and claims that the term "activating agent" is to be interpreted as including possible impurities or other accidentally occurrent substances, which may under some conditions serve or assist in promoting the reaction. Similarly the expressions "activated reaction" and the like are to be interpreted as of scope coextensive with the foregoing. Also the expression "aromatic hydrocarbon" is to be interpreted to comprehend homologues of benzol, and naphthalene; and the expression "homologues of benzol" is to be interpreted to comprehend benzol and its homologues.

What we claim as new and desire to secure by Letters Patent is:

1. A resin adapted to the plastic art which is the product of activated chemical reaction between a chloride of sulphur and an aromatic hydrocarbon body.

2. A gum adapted to the plastic art comprising a reaction product of a chloride of sulphur and an aromatic hydrocarbon body.

3. A gum adapted to the plastic art comprising a reaction product of a chloride of sulphur and naphthalene.

4. A gum adapted to the plastic art comprising a reaction product of sulphur monochloride and naphthalene.

5. A resinous plastic material capable of hardening, comprising a reaction product of a chloride of sulphur and an aromatic hydrocarbon body.

6. A plastic gum capable of hardening under heat treatment, comprising a product of an activated reaction between a chloride of sulphur and an aromatic hydrocarbon body.

7. A resinous plastic reaction product of a chloride of sulphur and an aromatic hydrocarbon body, adapted to harden gradually under heat treatment into a substantially infusible, insoluble and chemically inert substance.

8. A resinous product of chemical reaction between a chloride of sulphur and an aromatic hydrocarbon body activated by an inorganic agent.

9. A resinous product of chemical reaction between a chloride of sulphur and an aromatic hydrocarbon body activated by a metallic agent.

10. A resinous product of chemical reaction between a chloride of sulphur and an aromatic hydrocarbon body activated by a metallic sulphide.

11. A resinous plastic reaction product of sulphur mono-chloride and naphthalene activated by means of ferrous sulphide, adapted to harden gradually under heat treatment into a substantially infusible, insoluble and chemically inert substance.

12. The process of producing a resinous product adapted to the plastic art from a chloride of sulphur and an aromatic hydrocarbon body, which comprises bringing such compounds into intimate contact in the presence of an activating agent and maintaining such contact until reaction ensues.

13. The process of producing a resinous plastic material from a chloride of sulphur and an aromatic hydrocarbon body, which comprises slowly adding such compounds to one another in the presence of an activating agent to effect reaction thereof.

14. The process of producing a resinous product adapted to the plastic art from a chloride of sulphur and an aromatic hydrocarbon body, which comprises bringing said compounds into intimate contact through adding one compound slowly and in small portions to the other in the presence of an activating agent to effect reaction thereof, and heat treating the product resulting from such reaction.

15. The process of producing a resinous product adapted to the plastic art from a chloride of sulphur and an aromatic hydrocarbon body, which comprises bringing said compounds together in the presence of an activating agent, for reaction and promoting reaction between constituents of the resultant compound by application of heat.

16. The process of producing a resinous product adapted to the plastic art from a chloride of sulphur and an aromatic hydrocarbon body which comprises bringing such compounds into intimate contact in the presence of an inorganic activating agent and maintaining such contact until reaction ensues.

17. The process of producing a resinous product adapted to the plastic art from a chloride of sulphur and an aromatic hydrocarbon body which comprises bringing such compounds into intimate contact in the presence of a metallic activating agent and maintaining such contact until reaction ensues.

18. The process of producing a resinous product adapted to the plastic art from a chloride of sulphur and an aromatic hydrocarbon body which comprises bringing such compounds into intimate contact in the presence of a metallic sulphide activating agent.

19. The process of producing a resinous product adapted to the plastic art from sulphur monochloride and naphthalene which comprises reacting said compounds in the presence of a relatively small quantity of ferrous sulphide.

20. The process of producing a resin adapted to the plastic art from sulphur monochloride and naphthalene which comprises reacting substantially equal parts by weight of said compounds in the presence of an activating agent comprising a small quantity of a sulphide of iron.

In witness whereof, we have hereunto subscribed our names.

MYRON E. DELANEY.
LINWOOD T. RICHARDSON.